(No Model.)
T. E. KNAUSS.
FAN OR BLOWER.
No. 368,093. Patented Aug. 9, 1887.
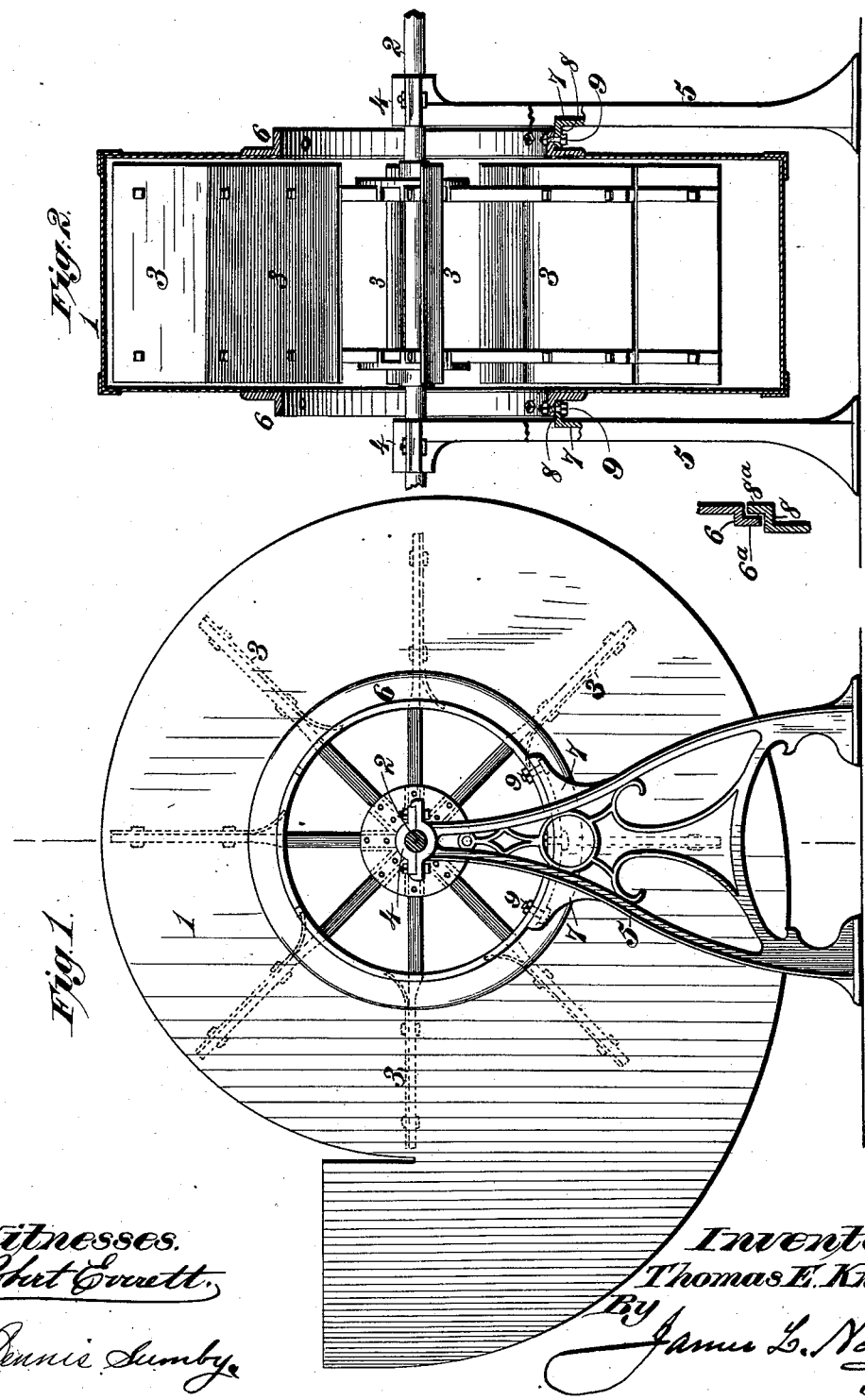
Witnesses.
Robert Everett
Dennis Sumby
Inventor:
Thomas E. Knauss
By James L. Norris
Atty

UNITED STATES PATENT OFFICE.

THOMAS E. KNAUSS, OF COLUMBUS, OHIO, ASSIGNOR TO THE P. HAYDEN SADDLERY HARDWARE COMPANY, OF SAME PLACE.

FAN OR BLOWER.

SPECIFICATION forming part of Letters Patent No. 368,093, dated August 9, 1887.

Application filed January 31, 1887. Serial No. 226,067. (No model.)

*To all whom it may concern:*

Be it known that I, THOMAS E. KNAUSS, a citizen of the United States, residing at Columbus, in the county of Franklin and State of Ohio, have invented new and useful Improvements in Fans or Blowers, of which the following is a specification.

My invention relates to fans or blowers for ventilating and other purposes; and the object in view thereof is to provide novel, simple, and inexpensive devices whereby the fan-case may be reversed in position without changing the engine or the fan-supports, whereby the blower may be used as an upcast or a downcast without losing the proper proportions and form of the casing as regards the vanes, on which the value of every fan as a ventilator must largely depend.

The invention consists in the several novel features of construction and combinations of parts, hereinafter fully described, and definitely pointed out in the claim following this specification.

In the accompanying drawings, Figure 1 is a side elevation of a ventilating fan and fan-casing embodying my invention. Fig. 2 is a central vertical section in the line of the fan-shaft.

In the said drawings, the reference-numeral 1 denotes the casing of ventilating-fan, constructed in the ordinary manner, and provided with a fan-shaft, 2, by which the fan blades or paddles 3 are rotated. This shaft is mounted in bearings 4 upon standards or legs 5, and is driven by a pulley or with engine connected to shaft 2 in any suitable manner.

Upon the external and parallel faces of the casing 1 are formed or mounted flanges or bearings 6, projecting outward and in circular form. These flanges or bearings are concentric with the axis of the fan-shaft 2, and may be formed on any suitable radius. Usually, however, it will be sufficient if said flanges surround the air-openings, or portion of openings, in the fan-case.

Upon the standards 5 and upon their inner faces are formed or mounted plates 7, each having an inwardly-projecting flange or bearing, 8, of arc or any other suitable shape, and formed upon a curve having the same radius as the circular flange 6. The flanges 8 may be of any suitable length, but ordinarily an arc of sixty or seventy degrees will answer every purpose. The fan-casing 1 is placed between the standards, its circular flanges 6 resting upon the curved arc-shaped flanges or bearings, 8. Bolts 9 are then passed through openings in both and nuts turned upon the ends of said bolts, thereby fastening the casing securely in position.

When it is desired to reverse the casing to convert it from an upcast to a downcast fan, or vice versa, the bolts 9 are removed and the casing is revolved, the circular flanges 6 sliding upon the curved flanges or seats 8. When in the required position, the bolts 9 are replaced, bolt-openings being cut in the flanges 6 at suitable intervals to accommodate the required adjustments. The fan-casing being at all times concentric with the shaft 2, no change in the engine and no shift in the position of the standards are required. The adjustments are easily and quickly made, and the form and proportions of the casing as regards the vanes or blades are preserved, thus insuring at all times the best results.

The flanges or bearings 7 and 8 may be made as shown in the detached portion of Fig. 2, and the flange 6 on the drum may have a similar form in cross-section, thereby forming on each part a flange, 6$^a$, and 8$^a$, respectively, which hold the parts in engagement.

Having thus described my invention, what I claim is—

The combination of the stationary standards 5, having journal-boxes 4 at their upper ends for the fan-shaft, and provided below said boxes on their inner faces with the laterally-projecting circular flanges 8, with the fan-case interposed between the standards, with its shaft in the boxes thereon, and provided at each side with an annular laterally-projecting flange, resting and rotatable on the flanges of the standards, and bolts 9, passing through said flanges to adjust the fan-case for use as an upcast or downcast, substantially as described.

In testimony whereof I affix my signature in presence of two witnesses.

THOMAS E. KNAUSS.

Witnesses:
C. H. HOUSEMAN,
MARTHA HOUSEMAN.